Dec. 14, 1937.  G. JOHNSON  2,102,558
NUT AND INSTALLATION THEREOF
Filed Sept. 26, 1935
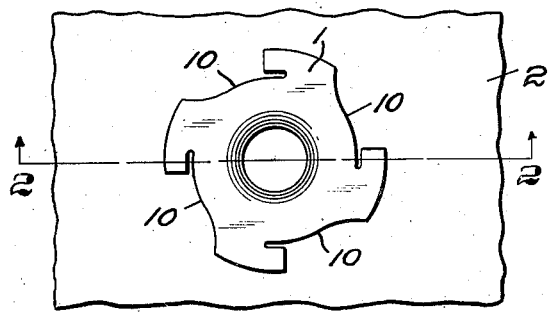
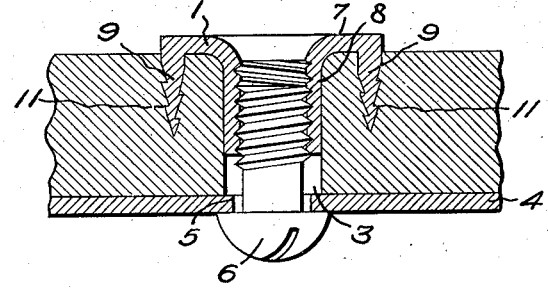
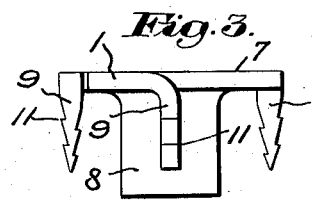
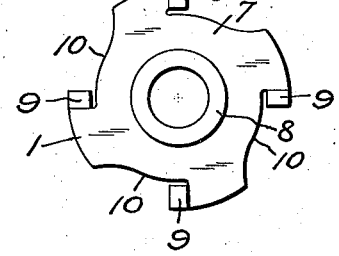
Inventor:
Gustav Johnson,
by
Walter J. Jones Atty.

Patented Dec. 14, 1937

2,102,558

UNITED STATES PATENT OFFICE 2,102,558

NUT AND INSTALLATION THEREOF

Gustav Johnson, West Roxbury, Mass., assignor to United-Carr Fastener Corporation, Cambridge, Mass., a corporation of Massachusetts Application September 26, 1935, Serial No. 42,298

7 Claims. (Cl. 85—32)

My invention aims to provide improvements in nuts and nut and screw fastened installations.

In the drawing which illustrates a preferred embodiment of my invention:

Figure 1 is a bottom plan view of a nut installation showing the nut and nut-supporting part;

Fig. 2 is a section of the installation taken on the line 2—2 of Fig. 1;

Fig. 3 is a side view of my improved nut member; and

Fig. 4 is a top view of my improved nut member.

One of the objects of my present invention is to provide a means associated with the base of a nut member of the type illustrated which may be projected into the nut-supporting part of an installation so as to prevent the nut from becoming dislodged from its supporting part when the cooperating screw member is being inserted.

The type of nut in most common use is usually provided with apertures in the base flange in order that it may be nailed to the support so as to be held in place until the cooperating screw member is in threaded engagement with it. By my present invention the aforementioned apertures and nails are unnecessary as the nut member will be engaged with the support by the projections which will be hereinafter more fully described.

My invention has been found especially useful in connection with a nut and screw secured installation having the screw members attached to the cooperating nut members by means of an automatic screw driver.

Other objects and purposes will be apparent from the foregoing description.

Referring to my invention as illustrated by the drawing, Figs. 1 and 2 represent a preferred nut and screw installation comprising a nut 1, a supporting part 2 to which the nut is attached, a bore 3 in the supporting part, a thin metal plate 4 having an aperture 5 and a screw member 6 extending through the aperture 5 of the plate 4 into threaded engagement with the nut 1 thereby holding all the parts in assembled relation.

Referring specifically to the nut member 1, with which part the important features of my invention are associated, I have shown in Figs. 3 and 4 a nut which is preferably made of a single piece of sheet metal having a base in the form of a flange 7 and a hollow shank 8 drawn from the material of the base 7 and threaded internally to cooperate with the threaded screw member 6.

In my preferred form, as illustrated in Figs. 1—4, I have provided a number of relatively flat prong-shaped projections 9 located at predetermined points around the outer periphery of the base. The projections 9 are formed by bending portions of the material, adjacent to and more or less parallel with the outside edge of the base, out of the plane of the base in the direction of the shank 8. As a result of this construction the base will be relieved at stated points 10 around its outside periphery (Figs. 1 and 4), thus permitting the nut to be formed from a minimum amount of material while providing for prongs of substantial length. Serrations 11 are formed on the free edges of the projections 9, in my preferred form, in order to provide means for better gripping engagement between the projections and the support 2.

In assembling the parts of the installation together, the shank 8 of the nut member is inserted in the bore 3 and the outside surface of the base 7 is tapped with a suitable tool until the projections 9 are embedded in the support for their full length and the side of the base 7 opposite the outside surface is located adjacent to one face of the support, as shown in Fig. 2. The nut is now in firm engagement with the support and the screw member 6 may be inserted into the nut without fear of the nut being dislodged from its seat before the nut and screw members are in threaded engagement.

The projections 9, while embedded in the support, will also aid in preventing relative rotation of the nut while the screw member is being tightened in engagement with the nut.

As will be observed my improved nut is of simple construction and is of great strength with increased ability to resist turning within the support, as well as displacement therefrom. This is possible largely because the prongs are cut from the flange along lines within the outer edges of the flange making possible long nail-like prongs of substantial length and cross section as compared to the length of the threaded shank and of greater length than the spacing between the prongs and outer walls of the shank. Thus I am able to secure an extremely strong nut-secured installation while confining the diameter of the parts to relatively small dimensions.

While I have illustrated and described a preferred embodiment of my invention, I do not wish to be limited thereby, because the scope of my invention is best defined by the following claims.

I claim:

1. A one piece metal nut comprising a base flange, a tubular threaded shank drawn from the base, and a plurality of locking prongs cut from the flange metal along lines within the outer edges of the flange, said prongs being bent at right angles, and being of greater length than the spacing between the prongs and the outer wall of the shank.

2. A one piece metal nut comprising a base flange, a tubular threaded shank drawn from the base, and a plurality of locking prongs cut from the flange metal along lines within the outer edges, said prongs being bent at right angles to the flange, and being of greater length than half the length of the shank.

3. A one piece metal nut comprising a base, a tubular threaded shank extending from one face of said base, and a plurality of tapering prongs cut from the metal of said base, said prongs being of greater length than half the length of the threaded shank, and being bent at right angles to the base, said prongs having at least one of their outer edges formed with offset shoulders to hold within a wood support when pressure is applied axially upon said nut in a direction tending to dislodge the nut from its support during the threading of a screw within the shank thereof.

4. A one piece metal nut comprising a base, a tubular threaded shank extending from one face of said base, and a plurality of tapering chordal prongs cut from the metal of said base, said prongs being of a length greater than the spacing between them and the outer wall of the shank, and being bent at right angles to the base along lines radially of the shank, said prongs having at least one of their outer edges formed with notches presenting offset shoulders substantially parallel to the flange to hold within a wood support when pressure is applied axially upon said nut in a direction tending to dislodge the nut from its support during the threading of a screw within the shank thereof.

5. In a nut secured installation, an apertured nut-carrying support, a metal nut having a threaded shank positioned within the aperture of said support, a base flange from which said shank extends bearing against one face of the support, fastening means formed integrally with said flange for resisting turning movement of the nut within the support and displacement therefrom when subjected to dislodging pressure exerted axially upon said nut, comprising a plurality of substantially square nail-like prongs disposed parallel to and around the shank and adapted to be driven into said support, said prongs presenting a plurality of flat side surfaces each disposed in a plane approximately radially of the shank and other faces substantially parallel to said base flange.

6. In a nut secured installation, an apertured nut-carrying support, a metal nut having a threaded shank positioned within the aperture of said support, a base flange from which said shank extends bearing against one face of the support, means for preventing turning of the nut within the aperture of said support and displacement therefrom, comprising a plurality of integral inwardly extending tapered prongs of a length greater than the spacing between the prongs and outer wall of the shank and presenting flat faces lying in planes axially of said shank and perpendicular to said flange for resisting turning movement of the nut.

7. In a nut secured installation, an apertured nut-carrying support, a metal nut having a threaded shank located in said support, a base flange from which said shank extends bearing against one surface of the support, and means for preventing rotation of the nut within the support and dislodgment therefrom after it has been engaged by a cooperating screw, comprising a plurality of slender tapering nail-like prongs cut from the edge portions of said flange and bent at right angles thereto, said prongs being of greater length than half the length of the threaded portion of the shank.

GUSTAV JOHNSON.